US012783834B2

(12) United States Patent
Broderick

(10) Patent No.: US 12,783,834 B2
(45) Date of Patent: Nov. 3, 2026

(54) DEEP INSPECTION OF VISUAL CODES IN A SCANNER DEVICE, AND APPLICATIONS THEREOF

(71) Applicant: INFINITE PERIPHERALS, INC., Irvine, CA (US)

(72) Inventor: John Broderick, Corona, CA (US)

(73) Assignee: INFINITE PERIPHERALS, INC., Irvine, CA (US)

(*) Notice: Subject to any disclaimer, the term of this patent is extended or adjusted under 35 U.S.C. 154(b) by 0 days.

(21) Appl. No.: 18/386,704

(22) Filed: Nov. 3, 2023

(65) Prior Publication Data

US 2024/0152715 A1 May 9, 2024

Related U.S. Application Data

(60) Provisional application No. 63/422,190, filed on Nov. 3, 2022.

(51) Int. Cl.
*G06K 7/14* (2006.01)
*G06K 7/10* (2006.01)

(52) U.S. Cl.
CPC ....... *G06K 7/1473* (2013.01); *G06K 7/10386* (2013.01)

(58) Field of Classification Search
CPC ........... G06K 7/10821; G06K 7/10881; G06K 7/10891; G06K 7/1404; G06K 7/146; G06K 7/1473; G06K 7/1491; G06K 2007/10524; G06K 2007/10534
See application file for complete search history.

(56) References Cited

U.S. PATENT DOCUMENTS

| | | | | |
|---|---|---|---|---|
| 11,288,474 B1 * | 3/2022 | Broderick | G06K 7/10891 |
| 11,803,717 B2 * | 10/2023 | Lim | G07G 1/0081 |
| 2016/0180132 A1 * | 6/2016 | Lim | G06K 7/10544 235/435 |
| 2017/0330471 A1 * | 11/2017 | Subiakto | G11B 33/025 |
| 2019/0220639 A1 * | 7/2019 | Lei | G06K 19/06028 |

FOREIGN PATENT DOCUMENTS

WO WO-2023215172 A1 * 11/2023 ......... G06K 7/10722

* cited by examiner

*Primary Examiner* — Thien M Le
*Assistant Examiner* — April A Taylor
(74) *Attorney, Agent, or Firm* — Sterne, Kessler, Goldstein & Fox P.L.L.C.

(57) ABSTRACT

In an embodiment, a scanner device is provided. The scanner device includes an optical detector and a processor. The optical detector being configured to read an optical label and return a string representing the optical label. The processing device configured to execute an operating system and a software application. The operating system comprising an inspection module configured to (i) receive the string from the optical detector and (ii) execute a script able to specify how to interpret the string and how to alter or enrich the string before passing the string to the software application for processing.

19 Claims, 5 Drawing Sheets

DEEP INSPECTION OF VISUAL CODES IN A SCANNER DEVICE, AND APPLICATIONS THEREOF

CROSS-REFERENCE TO RELATED APPLICATIONS

This application claims the benefit of U.S. Provisional Application No. 63/422,190, filed on Nov. 3, 2022, the contents of which is incorporated by reference herein in its entirety.

BACKGROUND

Field

This field is generally related to scanning devices.

Related Art

Optical labels, such as barcodes, represent data in a visual, machine-readable format. One type of barcode, known as linear or one-dimensional (1D) barcodes, can represent data by varying the widths and spacing of parallel lines. Another type of barcode, known as matrix codes or two-dimensional (2D) barcodes, uses rectangles, dots, hexagons, and other patterns to represent data.

Barcodes have many applications. In stores, universal product code (UPC) barcodes are pre-printed on most items and are used for inventory and to check out. Barcodes are used in healthcare and hospital settings for things like patient identification (to access patient data, including medical history, drug allergies, etc.). They can also be used to keep track of objects and people; they are used to keep track of rental cars, airline luggage, nuclear waste, registered mail, express mail, and parcels. Barcoded tickets allow the holder to enter sports arenas, cinemas, theaters, fairgrounds, and transportation, and are used to record the arrival and departure of vehicles from rental facilities, etc.

A barcode reader (or barcode scanner) is an optical scanner that can read printed barcodes, decode the data contained in the barcode and send the data to a computer. One type of handheld scanner is gripped in a user's palm. With these handheld barcode scanners, the user encloses the handle with all five fingers and uses the trigger button to activate the scanner, like the operation of a handgun. One downside of the handheld barcode scanners is that the user of the scanner has to put down the scanner to use their hand. If the user is transporting packages or taking inventory while having to repeatedly put down and pick up the scanner this can result in lost productivity.

To reduce this inefficiency, ring scanners operate by looping around at least one finger, enabling an operator to continue using both hands while carrying the scanner. In this way, workers can continue to use both hands when climbing ladders or stairs, handling large items, or operating machinery.

Existing ring scanners may provide only limited functionality beyond reading the actual barcode. For example, they may only have limited or nonexistent capabilities to alter or interpret a barcode being scanned. Sometimes secondary devices are used to interpret the barcode. In some cases, ring scanners are connected to secondary devices, either remotely or attached to an operator's forearm. If output is needed for the operator, it may be presented in a separate screen that the operator might not even be viewing. In one example operation, a postal worker may be scanning packages and some subset of those packages may be flagged for the postal worker to take aside for further inspection. In that example, a separate monitor may be used to display data for the additional inspection when the worker scans a package that needs special treatment.

To address these issues, improved rings scanners are needed.

BRIEF SUMMARY

In an embodiment, a scanner device is provided. The scanner device includes an optical detector and a processor. The optical detector is configured to read an optical label and return a string representing the optical label. The processing device is configured to execute an operating system and a software application. The operating system includes an inspection module configured to (i) receive the string from the optical detector and (ii) execute a script able to specify how to interpret the string and how to alter or enrich the string before passing the string to the software application for processing.

System, method, and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements. The drawings are illustrative and may not be to scale.

DETAILED DESCRIPTION

Existing ring scanners may provide only limited functionality beyond reading the actual barcode. To deal with that, embodiments provide a way to interpret and modify a scanned barcode at the barcode scanner before passing to an application. To interpret and modify the scanned barcode, software known as deep inspection logic may be used. Deep inspection logic may be incorporated into an operating system running on the barcode scanner and the logic may reference at least one script that defines how to interpret and alter the scanned barcode. The script provides a dynamic coding layer to implement the interpretation and modification of the scanned barcode. With the deep inspection logic being integrated as part of the operating system, it may be applied to the scanned barcode value immediately after it is received by a driver for the optical detector and before the value is passed to any software application that could utilize the barcode scanning.

These scripts provide only capabilities of a scripting language, such as JavaScript. They provide the ability to override an incoming barcode or symbology to implement various functionality. The script can also access other input and output devices on the ring scanner and activate them according to contents of the barcode. For example, a script can receive a barcode analyzed to determine whether it represents a valid value and symbology. If it is invalid, the script may instruct the barcode scanner to remain active and to emit a sound or vibrate. In this way, the script informs the operator that the barcode is invalid and the operator knows to look for and scan a different barcode that may be on the same package.

Figure 1:
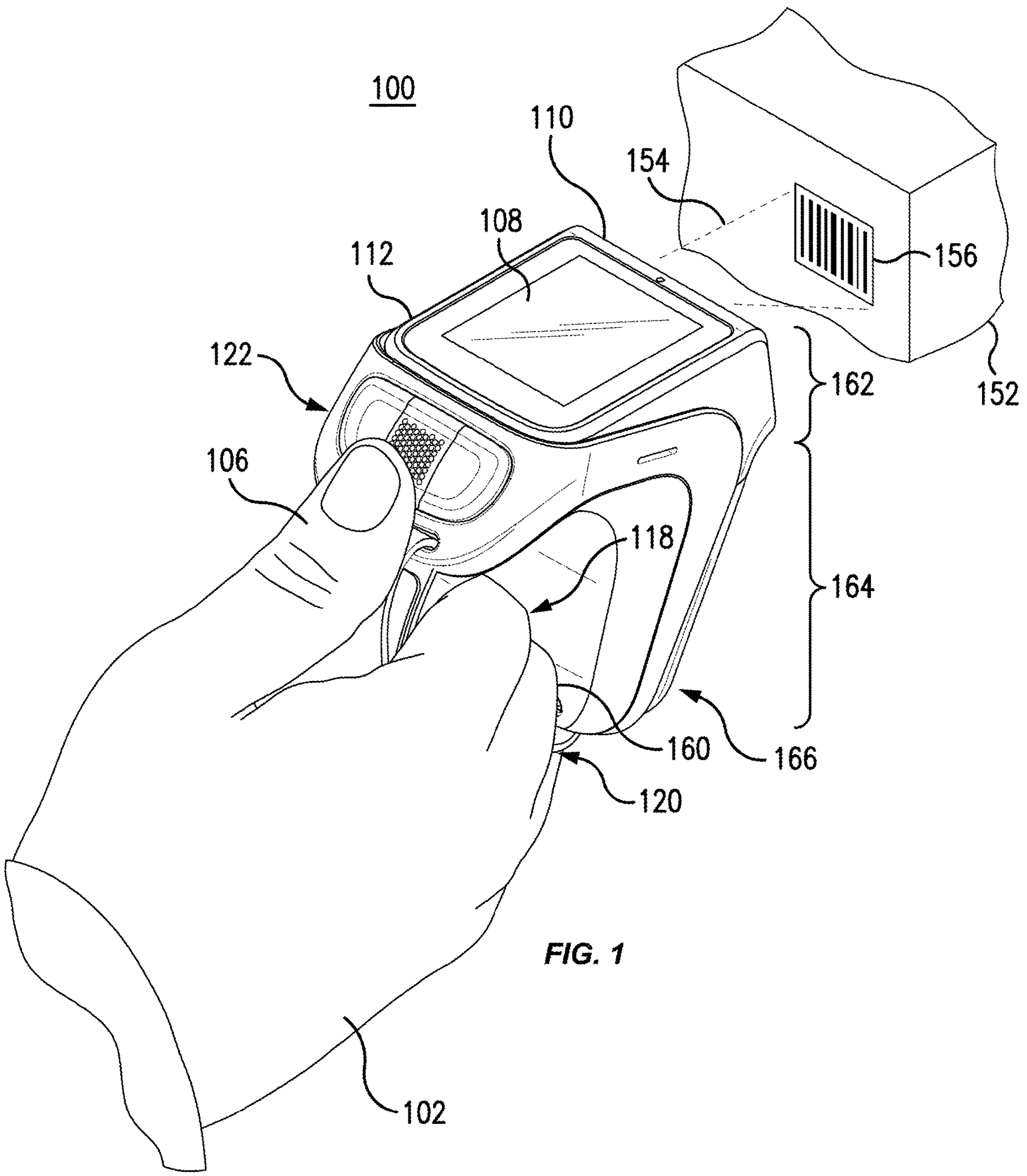
FIG. 1 is a diagram illustrating a ring scanner in operation, according to an embodiment.

FIG. 1 is a diagram 100 illustrating a ring scanner in operation, according to an embodiment. Diagram 100 illustrates a user/operator having a hand 102. Hand 102 is gripping a ring scanner device 112. Ring scanner device 112 has a display 108 and an optical detector 110.

Ring scanner device 112 has a loop through which an index finger 118 and a middle finger 120 pass through to grip and hold ring scanner device 112. The loop is configured to be gripped by index finger 118 and middle finger 120. It presses against the palmar side of index finger 118 and middle finger 120. Because the loop enables an operator to grip ring scanner device 112 with just a loop around the operator's fingers, the operator maintains use of her hands. For example, the operator can continue to use her hands to operate equipment, carry packages, and climb ladders. The loop may be configured to be gripped by index finger 118 and middle finger 120 such that the palm is in a neutral position when the optical detector is oriented in an upright direction. In this way, a user need not pronate the hand when transitioning from using the hand to grip a package from the package's side to scanning the optical label.

Display 108 is an output device for presentation of information in visual form. It outputs information that is supplied to it from a computing device (not shown) in ring scanner device 112, converting electrical signals into light. In different examples, display 108 can be an electroluminescent display (ELD), liquid crystal display (LCD), light-emitting diode (LED) backlit LCD, thin-film transistor (TFT) LCD, light-emitting diode (LED) display, organic light-emitting diode (OLED) display, active-matrix organic light-emitting diode display (AMOLED), plasma display panel (PDP), quantum dot light-emitting diode (QLED) display, or electronic paper, such as E INK paper available from E Ink Corporation of Cambridge, Massachusetts.

Optical detector 110 is an optical scanner that can read printed optical labels such as barcodes, decode the data contained in the optical label, and send the data to a computer. It may include a light source, a lens, and a light sensor for translating optical impulses into electrical signals. In different embodiments, optical detector 110 can be a pen-type reader, a laser scanner, a charge-coupled device (CCD) reader, a light emitting diode (LED) scanner, a camera-based reader, a video camera reader, a large field-of-view reader, or an omnidirectional barcode scanner.

As shown in diagram 100, barcode 156 is oriented in a horizontal direction, read left to right or right to left. Barcode 156 is a linear dimensional (1D), one dimensional barcode with its lines running vertical to ground. In other embodiments, barcode 156 may be two-dimensional and use rectangles, dots, hexagons, and other patterns. Barcode 156 may have a symbology, defining a method of representing numeric or alphabetic digits using bars and spaces that are easily scanned by computer systems. Examples of one dimensional barcode symbologies include UPC-A (Data capacity of 12 numeric digits—11 user specified and 1 check digit), UPC-E (Data Capacity of 7 numeric digits—6 user specified and 1 check digit), Code 128 (Variable length alphanumeric data) and 12 of 5 (Variable length numeric data). Two dimensional symbologies have a two-dimensional way of representing data—horizontally and vertically—and may be able store a greater amount of information (hundreds of characters), in a much smaller space, compared to one dimensional codes.

Ring scanner device 112 further includes a body piece 166, which includes an upper body portion 162 and a lower body 164. Upper body portion 162 rests on a portion of index finger 118 facing a thumb 106 of hand 102. Lower body 164 covers a dorsal side of index finger 118 and middle finger 120 of hand 102. Upper body portion 162 and lower body 164 are affixed to one another and angled to cover at least a portion of the thumb-facing side of index finger 118 and the dorsal side of middle finger 120. Together with loop 116, upper body portion 162 and lower body portion 164 encircle index finger 118 and middle finger 120. More specifically, together with loop 116 (labeled in FIG. 2A), upper body portion 162 and lower body 164 may encircle a middle phalanx portion of index finger 118 and middle finger 120.

Upper body portion 162 includes a plurality of buttons 122 that, when selected, cause ring scanner device 112 to perform certain actions. Each of the plurality of buttons 122 may be a switch mechanism with a surface that can be depressed, or pushed, by a finger. When the surface is depressed an electrical signal is sent to input information and possibly trigger an action. Each of the plurality of buttons 122 may have a spring to return to their un-pushed state. Other types of buttons may be used as well, such as virtual buttons presented on a touchscreen display.

As will be described below, the plurality of buttons 122 may cause optical detector 110 to activate and scan barcode 156 or may input data into a computing device controlling aspects of ring scanner device 112. The plurality of buttons 122 are positioned on ring scanner device 112 to be selected by thumb 106.

In particular, buttons 122 are positioned to be selected by thumb 106 when hand 102 is gripping a ring scanner device 112, and index finger 118 and middle finger 120 are bent. According to an embodiment, buttons 122 are positioned to be selected when index finger 118 and middle finger 120 are bent at a proximal interphalangeal joint 160. Proximal interphalangeal joint 160 sits between a middle phalanx and proximal phalanx of index finger 118 and middle finger 120. Bending at proximal interphalangeal joint 160 may be more ergonomical than bending other joints, such as the metacarpophalangeal joint of index finger 118 and middle finger 120.

Display 108 may be a touchscreen display. A touchscreen display is an assembly of both an input (touch panel) and output (display) device. The touch panel may be layered on the top of the output electronic visual display. A user can give input or control a computing device (not shown) in ring scanner device 112 through simple or multi-touch gestures by touching the screen with a special stylus or one or more fingers. In different examples, a touch panel may be a resistive touchscreen panel, a surface acoustic wave (SAW) touch panel, a capacitive touchscreen panel, or an infrared touchscreen panel.

When display 108 is a touchscreen display, display 108 will also be positioned such that at least a portion of display 108 can be selected by thumb 106 when hand 102 is gripping a ring scanner device 112, and index finger 118 and middle finger 120 are bent at the proximal interphalangeal joint 160. Display 108 is configured to output visually from the computing device. Display 108 may be angled toward thumb 106 to enable thumb 106 to select the touchscreen when hand 102 is gripping a ring scanner device 112, and index finger 118 and middle finger 120 are bent at the proximal interphalangeal joint 160.

Figure 2A:
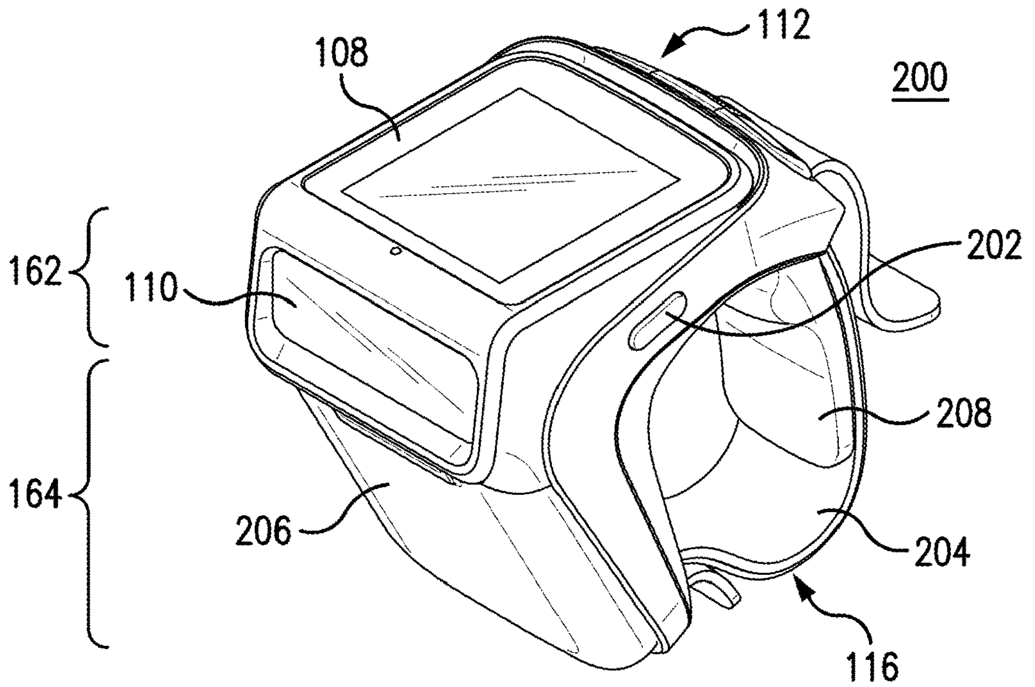
FIGS. 2A-B are schematic diagrams illustrating the ring scanner in greater detail, according to an embodiment.
Figure 2B:
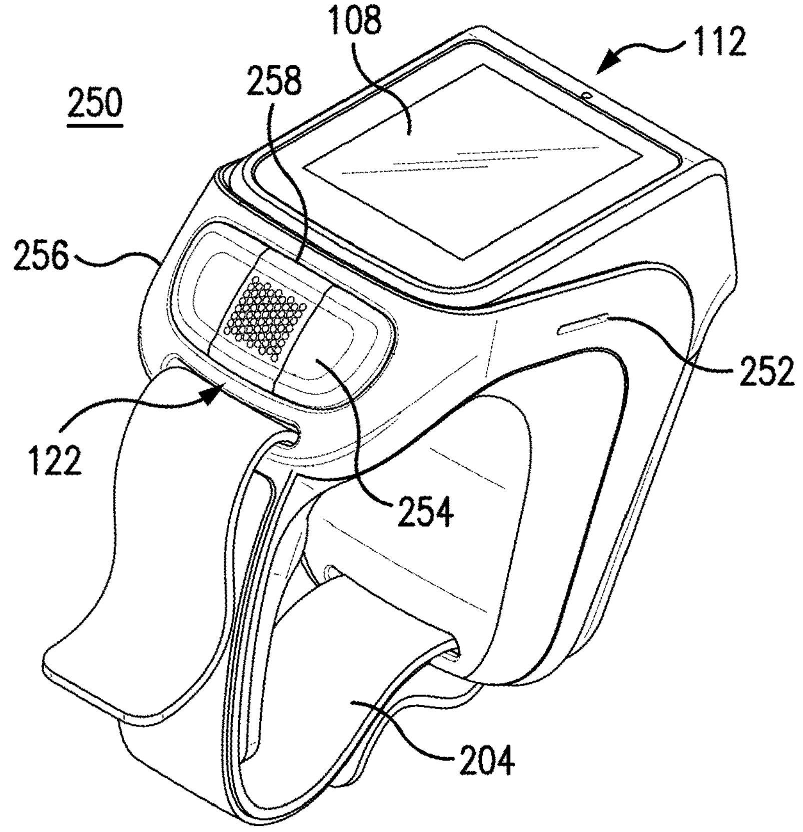

FIGS. 2A-B are schematic diagrams illustrating the ring scanner in greater detail, according to an embodiment. FIG. 2A illustrates a front three-quarter view 200 of ring scanner device 112. As shown from this perspective, ring scanner device 112 includes a battery 206, power button 202, strap 204, and semi-rigid portion 208.

Battery 206 is a device including one or more electrochemical cells to provide power for ring scanner device 112. In an example, battery 206 may be a lithium-ion battery. According to an embodiment, battery 206 may be removable so that it can be swapped out with fully charged batteries when battery 206 is depleted. Additionally or alternatively, battery 206 could be internal to ring scanner device 112 and not removable. Power button 202 is a button that, when selected, causes ring scanner device 112 to power on or off.

Strap 204 is a ribbon used to fasten ring scanner device 112 to the operator's fingers. As described above, strap 204, in conjunction with other components of ring scanner device 112 may encircle an operator's fingers. Strap 204 may be made of nylon webbing, leather, or other flexible materials. It also may be an adjustable strap positioned to encircle the at least one finger.

Semi-rigid portion 208 protrudes from upper portion 162 and is situated behind strap 204, in particular between strap 204 and the operator's fingers (not shown). Semi-rigid portion 208 may be flexible such that, as strap 204 is tightened, the tightened strap may pull semi-rigid portion 208 to tighten on the operator's fingers. Semi-rigid portion 208 may serve to allow strap 204 to be tightened, enabling the operator to maintain a tight grip on ring scanner device 112 without irritating the operator's fingers. In an embodiment, semi-rigid portion 208 may be made of rubber or a rubber-like material. In illustrative examples, semi-rigid portion 208 may be made of Thermoplastic Polyurethane (TPU), Thermoplastic Elastomer (TPE), butyl (IIR), nitrile (NBR), Neoprene® (CR), Ethylene Propylene Diene Monomer (EPDM), Silicone (Q), or Viton®.

FIG. 2B illustrates a rear three-quarter view 250 of ring scanner device 112. As can be seen from this perspective, ring scanner device 112 includes a speaker 252 and a plurality of buttons 122.

Speaker 252 is a device which converts an electrical audio signal into a corresponding audible sound. Example speakers include moving-iron loudspeakers, piezoelectric speakers, magnetostatic loudspeakers, electrostatic loudspeakers, ribbon and planar magnetic loudspeakers, bending wave loudspeakers, flat panel loudspeakers, Heil air motion transducers, transparent ionic conduction speakers, plasma arc speakers, thermoacoustic speakers, rotary woofers, moving-coil, electrostatic, electret, planar magnetic, and balanced armature.

As illustrated in FIG. 2B, buttons 122 includes three buttons: left button 256, right button 254, and center button 258. Left and right buttons 256 may input selections into a computing device (not shown) in ring scanner device 112. This may cause an action to be specified by an application running on the computing device. In this way, embodiments enable interactive applications to be executed by ring scanner device 112.

Center button 258 is configured to, when selected, activate optical detector 110 to read a barcode. It also may send input data to the computing device.

Figure 3:
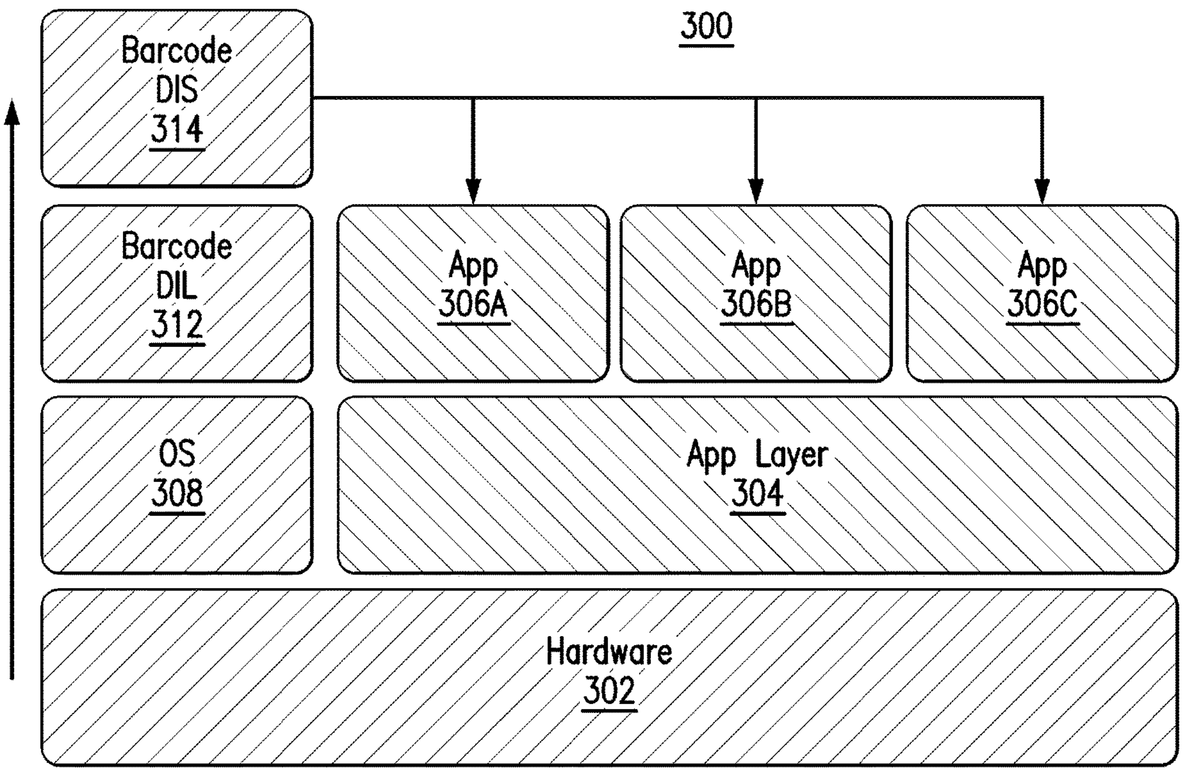
FIG. 3 is a system diagram illustrating components of the ring scanner, including those used for deep inspection of barcode scanners.

FIG. 3 illustrates a system 300 with components of the ring scanner, including those used for deep inspection of barcode scanners. System 300 includes hardware 302, operating system 308, barcode deep inspection logic 312, barcode deep inspection script 314, application layer 304, and applications 306A-C. Each of these are described in turn.

Hardware 302 includes various hardware electronic components on the ring scanner. The ring scanner may include a computer system and hardware 302 may include the physical components needed for the computer system to operate. This includes a processor and memory, and input and output devices as discussed in greater detail below with respect to FIG. 5.

Operating system 308 is a system software that manages computer hardware, software resources, and provides common services for computer programs. An operating system (OS) is system software that manages computer hardware, software resources, and provides common services for computer programs. Operating system 308 schedules tasks for efficient use of the system resources (such as processor and memory resources). Operating system 308 acts as an intermediary between programs and for memory allocation and access to input and output components. To act as an intermediary between programs and input and output components, operating system 308 may use device drivers with code to interact directly with the components. Operating system 308 may make system calls available to applications 306A-C and application layer 304 that allow applications 306A-C to access a system resource (such as an input component) to be interrupted when an event occurs at a system resource (such as an input component). An example operating system 308 may include the ANDROID operating system, available from Alphabet, Inc. of Mountain View, CA.

Barcode deep inspection logic (DIL) 312 may be custom code (e.g., a software module) incorporated in operating system 308. For example, an open source operating system may be forked to include barcode deep inspection logic 312. Barcode deep inspection logic 312 may include a registry indicating which, if any, barcode deep inspection script 314 to execute when an optical scanner device is activated. Barcode deep inspection logic 312 may include the necessary logic to execute barcode deep inspection script 314. For example, barcode deep inspection logic 312 may include a JavaScript engine that executes JavaScript code. An example JavaScript engine is a V8 engine available from Alphabet, Inc. of Mountain View, CA. When operating system 308 receives a barcode value, or string, from an optical detector, operating system 308 passes the value to barcode deep inspection logic 312, which passes the value to barcode deep inspection script 314.

Barcode deep inspection script (DIS) 314 receives a barcode value detected by an optical detector from barcode DIL 312 and processes it. To process it, barcode deep inspection script 314 can specify how to alter or enrich the string before passing the string to the software application for processing. Barcode deep inspection script 314 may include executable code to determine whether to accept or reject the barcode. The executable code may include regular expression matching. When the barcode is accepted, deep inspection script 314 passes the barcode to the software application for processing and deactivates the optical scanner, and when the barcode is rejected, deep inspection script 314 may signal to keep the optical detector activated to enable the user to scan another barcode.

Deep inspection script 314 may be configured to alter the string to a form consistent with a second symbology different from a first symbology received from the optical scanner. The first symbology may be incompatible with one or more applications 306A-C or with a legacy system that operates in concert with one or more applications 306A-C. In contrast, the second symbology may be compatible with one or more applications 306A-C or with a legacy system that operates in concert with one or more applications 306A-C.

After deep inspection script 314 completes processing on the barcode value, deep inspection script 314 broadcasts the value to one or more applications 306A-C. For example, applications 306A-C may subscribe to a callback function that gets executed when deep inspection script 314 is completed and the barcode value that deep inspection script 314 produced is passed to applications 306A-C as a parameter to the callback function.

Application layer 304 comprising applications 306A-C may use the barcode to implement, for example, logistics, inventory applications, security applications, mail, luggage, rental cars, and point-of-sale devices applications.

Figure 4:
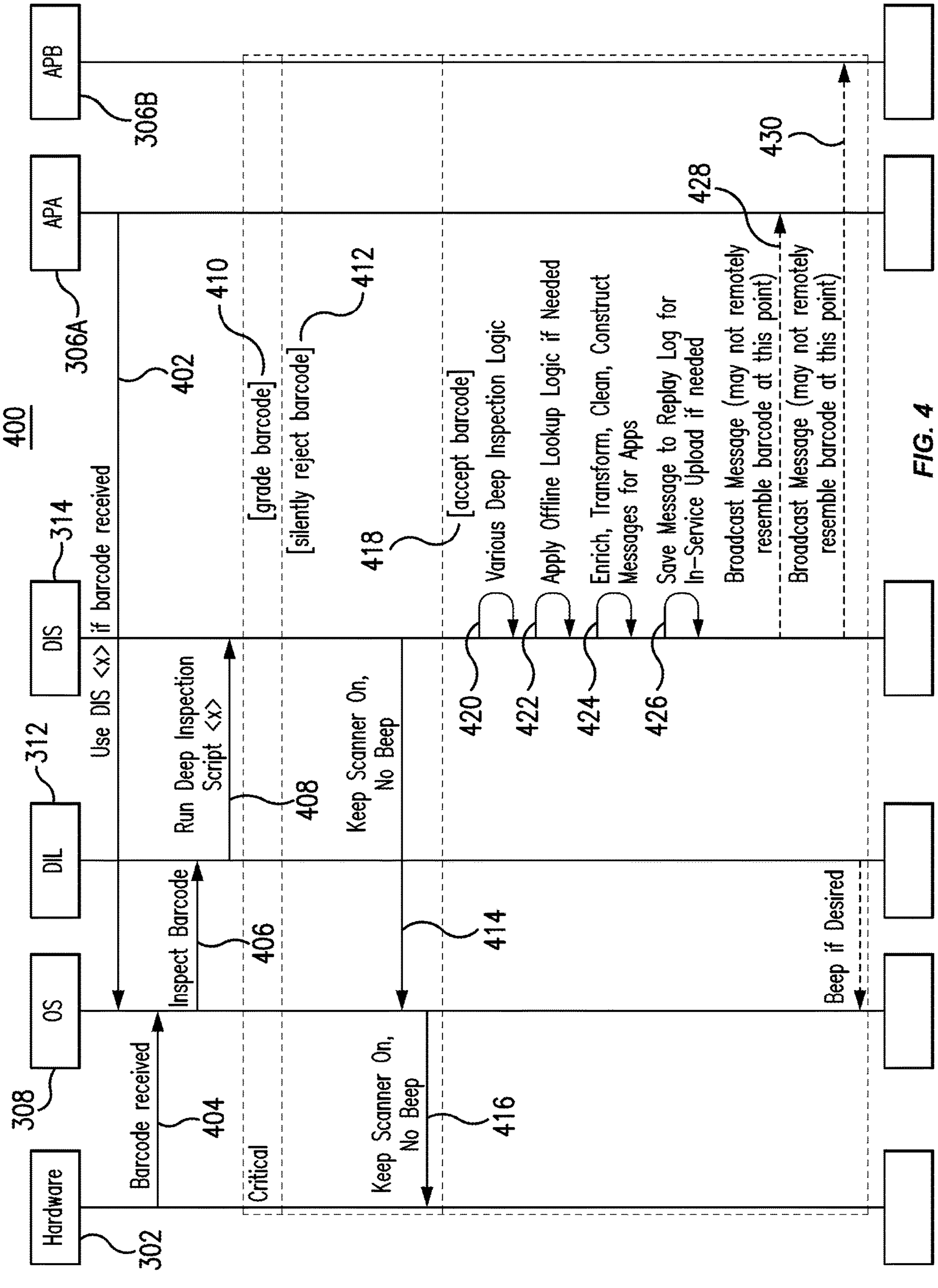
FIG. 4 is a swim lane diagram illustrating how the software components of the ring scanner can interact to provide deep inspection of the barcode.

The operation of system 300 is described in greater detail with respect to the method in FIG. 4.

FIG. 4 is a diagram illustrating a method 400 demonstrating how the software components of the ring scanner can interact to provide deep inspection of the barcode.

At 402, a message is sent from application 306A to OS 308 instructing OS 308 to use a deep inspection script, in this case deep inspection script 314, when a barcode is detected by the barcode scanner. The message may include a link to deep inspection script 314. In response to the message, OS 308 may store deep inspection script 314 or a local storage address of deep inspection script 314 in a table or a registry file.

At 404, a barcode is detected by an optical scanner in hardware 302. For example, a device driver installed in OS 308 may communicate with the optical scanner and may detect a signal indicating that the barcode was received. The optical scanner may communicate a string (including, for example, a numeric or alphanumeric value) to OS 308. In additional examples, the optical scanner may include other information, such as a symbology of the barcode detected.

At 406, OS 308 passes the scanned barcode value to deep inspection logic 312. If OS 308 has any scripts registered, deep inspection logic 312 will begin executing the registered scripts, in this case deep inspection script 314.

At 408, deep inspection logic 312 executes deep inspection script 314, passing to script 314 the barcode string and, if available, the symbology too. Executing deep inspection script 314 may involve use of a Javascript engine as described above. Steps 410-426 describe possible actions of deep inspection script 314 and can vary according to what is defined in deep inspection script 314.

At 410, deep inspection script 314 grades the barcode to determine whether it is valid. The script may specify a pattern for the string to be accepted as a valid barcode. The pattern for the string may involve a ruleset describing how to determine whether a string includes proper content and format for the software application.

For example, shippers often include a variety of non-delivery barcodes on their packaging and envelopes. When a scan is required (e.g. Arrival At Unit Scan, Delivery Scan, etc.), scanning the wrong barcode can result in a defect (e.g. proof of delivery not available) or result in popups that slow down the workflow (e.g. Barcode Unknown). In that example, deep inspection script 314 may determine whether the barcode is a valid shipping barcode. A U.S. package delivery service may support a complex variety of barcodes. A package, for instance, may have one of hundreds of service types (e.g., FirstClass/COD/Express Delivery/Insurance>$500/Live Pets/Signature Required/Adult Delivery, etc.). The barcode for each of these service types must, to be valid, conform to a complex ruleset that includes regular expression patterns, check digits, embedded zip codes, group separator codes, recursion, invisible characters, application paths, etc. (e.g., vehicle barcode?, Mail barcode?, Package Barcode?, PO Box barcode?, etc.). Deep inspection script 314 may determine whether the scanned barcode complies with this ruleset at step 410.

If at step 410 deep inspection script 314 determines that the barcode is invalid, operation proceeds to steps 412-416. Otherwise, if at step 410 deep inspection script 314 determines that the barcode is valid, operation proceeds to steps 412-418.

At 412, for barcodes that are determined to be invalid by DIS 314, DIS 314 can signal OS 318 to keep the scanner on and not make a sound (e.g., beep) indicating acknowledgement of the barcode. DIS 314 may send a message to OS 308 at step 414 and OS 308 may send messages to the underlying hardware 302 at 416. In this way, an operator may recognize that the correct barcode has yet to be scanned and may look for another barcode on the package to scan.

At 420, DIS 314 applies logic to analyze, process, and enrich the barcode value. Various operations available are described at steps 420-426.

At 422, DIS 314 looks up the string in a table stored in a memory of the ring scanner. DIS 314 enriches the string with a message generated based on data in the table corresponding to the string and passes the enriched string to the software application.

For example, a ticketing agent at a large event may need to make an immediate decision on whether to let a patron in. The DIS 314 may look up whether the ticket is valid using a table stored in memory on the ring scanner device. The offline table may be used to (a) accept tickets at the gate, (b) lookup loyalty information for concession discounts, (c) lookup seat numbers inside the event, etc. In one possible embodiment, DIS 314 may first look to the table and if a ticket identifier represented in the barcode string is unavailable in the table, the ring scanner may access a remote server. DIS 314 can enrich the barcode string based on the information retrieved. For example. The data received by DIS 314 may be {barcode:12345, symbology}, and DIS 314 may enrich the data to resemble {barcode=x, name=John Doe, seat=101A}.

At 424, DIS 314 enriches, cleans, and transforms the barcode to construct messages for the applications. In an embodiment, the optical label has a first symbology with and the module is further configured to, based on the script, alter the string to a form consistent with a second symbology different from the first symbology and pass the altered string to the application. More particularly, DIS 314 cleans and returns the new barcode and barcode symbology type as needed by third party applications such as to strip out invisible characters, modify the incoming barcode to prepend, strip, or change the contents or symbology indicator.

In one example, to replace or supplement old scanners with new, the barcodes and symbologies must arrive in whatever legacy format the current scanners use. Symbology types change between barcode vendors as can prefixes, suffixes, and delimiters. If a new scanner device requires Code39 to be Symbology 5, but the backend system requires Code39 to be Symbology 1, then a rule to map all incoming symbologies of type 5 to type 1 can be implemented by DIS 314.

In another example, if the backend system required specific logic for any/all barcode formats, the inspection script can remap the barcodes. For instance if they legacy scanners returned <STX><barcode><ETX> the inspection script can otherwise alter the incoming barcode to match expected formats in this case adding <STX> to the beginning of the barcode, stripping out invisible characters from the barcode, and post-pending <ETX>. The logic can be as easy or complex as needed and is not limited to prefix/suffix appendages.

At 426, DIS 314 stores the enriched and transformed barcode message locally in memory on the ring scanner for later transmission. Many operating environments may have poor Wi-Fi or cellular coverage. Applications may need to implement their own transport of information in offline environments commonly known as a "store and forward" method. The data is stored while the ring scanner is offline and later transmitted when the ring scanner is online and able to connect to a remote server. For example, an on-going timer may be run and periodically a synchronization process may run. When the synchronization process is run any new messages received from the last synchronization are transmitted to the remote server.

After processing the barcode and generating a message, DIS 314 broadcasts the generated message to applications at 428 and 430.

Figure 5:
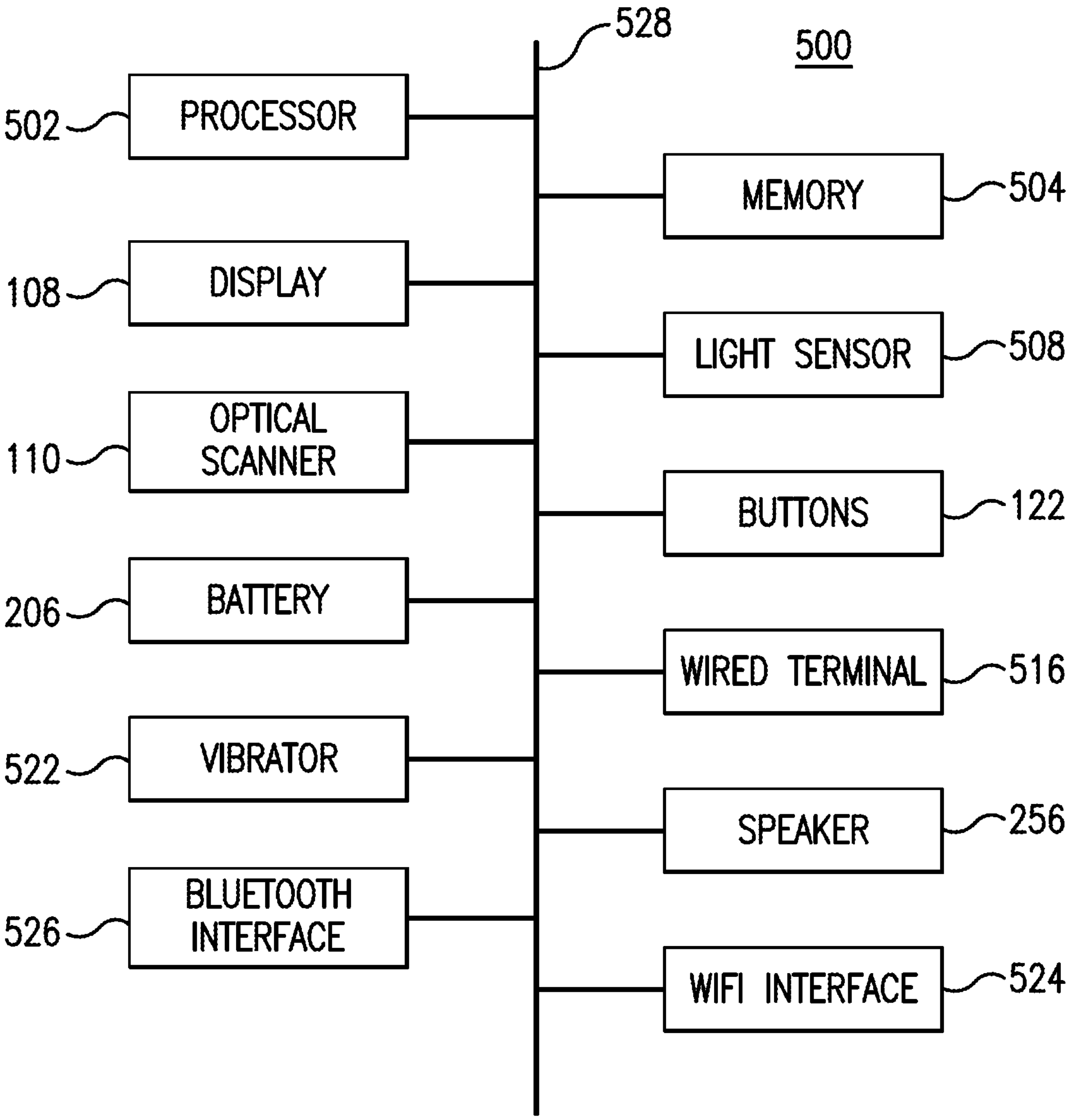
FIG. 5 is an architecture diagram illustrating hardware components of the ring scanner, according to an embodiment.

FIG. 5 is an architecture diagram illustrating hardware components of the ring scanner, according to an embodiment. As discussed with respect to previous figures, diagram 500 includes display 108, optical detector 110, buttons 122, battery 206, and speaker 256. In addition to those components, diagram 500 includes a processor 502, memory 504, light sensor 508, wired terminal 516, vibrator 522, Bluetooth interface 526, and Wi-Fi interface 524. Each of these components may be enclosed within a housing as shown in FIGS. 2A-B.

Bus 528 is a communication system that transfers data between the hardware components of a ring scanner. In addition to transferring data, bus 528 may also transfer electrical power, such as from battery 206 to other components. In this way, bus 528 communicatively and electrically couples the various components together.

It may be appreciated for those skilled in the art that a plurality of signal lines or buses 528 may exist, thus different components may be linked by different signal lines or buses 528, and that a signal line or buses 528 depicted in the schematic diagram may represent a plurality of such.

Memory 504 may include random access memory (RAM) and may also include nonvolatile memory, such as read only memory (ROM) and/or flash memory. Memory 704 may be embodied as an independent memory component, and may also be embedded in another component, such as processor 502, or may be embodied as a combination of independent as well as embedded, and/or a plurality of memory components is present, the invention is not so limited. Memory 504 is adapted to include software modules (a module is a set of instructions), such as those described below for FIG. 3.

Processor 502 is adapted to run instructions stored in memory 504. Processor 502 may be a micro-controller unit (MCU), a digital signal processor (DSP), and/or an Image/Video Processing unit or the like components that run instructions. An example of an MCU is MSP432P401x, available from Texas Instruments Inc. of Dallas, Texas. An example of a DSP is C5000, available from Texas Instruments Inc. of Dallas, Texas. An example of an image/video processor is OMAP3525, available from Texas Instruments Inc. of Dallas, Texas. One or more processors 502 may be present. Processor 502 may be an independent component, it may also be embedded in another component.

Wired terminal 516 is adapted to attach to a wired network, including, but not limited to, Ethernet, USB or thunderbolt.

Diagram 500 includes two wireless interfaces, Wi-Fi interface 524 and Bluetooth interface 526. Wi-Fi interface 524 may provide a network interface accessible by applications running on processor 502. Bluetooth interface 526 may be adapted to enable the ring scanner device to interact with peripheral devices, such as headsets (not shown).

Light sensor 508 is a photodetector. It is a sensor of light. A photodetector has a p-n junction that converts light photons into current. The absorbed photons make electron-hole pairs in the depletion region. Photodiodes and photo transistors are a few examples of photo detectors. In a different example, light sensor 508 may be a photoemission or photoelectric effect photodetector, thermal photodetector, polarization photodetector, or photochemical photodetector.

In an example operation, light sensor 508 may signal to processor 502 when light is detected. Processor 502, in turn, may adjust the brightness of display 108. Automatically adjusting brightness in this way may have the effect of conserving power in battery 206.

Vibrator 522 is a device that causes vibration when receiving a specified signal from processor 502. Vibrator 522 is a mechanical device to generate vibrations. To generate the vibrations, vibrator 522 may include an electric motor with an unbalanced mass on its driveshaft. Vibrator 522 may be a vibrating structure gyroscope implemented as a microelectromechanical system (MEMS).

Speaker 256 is coupled to processor 502 and is configured to cause the ring scanner device to emit sound as specified by commands from processor 502. In this way, speaker 256 may provide audio to a user of the ring scanner device as specified by an application running on processor 502.

Buttons 122 may send commands to processor 502, or other components such as optical detector 110. When a user presses one of buttons 122, a signal may be sent to processor 502. That signal may cause an interrupt command in the software application running in processor 502, causing processor 502 to run specific commands that an application specifies to correspond to that button input. In this way, using buttons 122, a user can trigger actions as specified by the application running on processor 502.

In response to inputs it receives from buttons 122, processor 502 can output information to display 108 as specified by a software application running on processor 502. In addition, as mentioned above, display 108 can be a touch-screen display. In this way, interactive applications can be implemented within a ring scanner device.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications, such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by a skilled artisan in light of the teachings and guidance.

The breadth and scope of the present invention should not be limited by any of the above-described exemplary embodiments, but should be defined only in accordance with the following claims and their equivalents.

What is claimed is:

1. A scanner device, comprising:

an optical detector configured to read an optical label and return a string representing the optical label; and a processor configured to execute an operating system and a software application, wherein the operating system is configured to execute a script to:

receive the string from the optical detector, and specify how to interpret the string, how to alter the string, or how to enrich the string before passing the string to the software application for processing; and store the string on the scanner device for later transmission to a remote server when the remote server becomes available.

2. The scanner device of claim 1, wherein the script is further configured to determine whether to accept or reject the string.

3. The scanner device of claim 2, wherein the script is further configured to, when the string is accepted, pass the string to the software application for processing and deactivate the scanner device, and when the string is rejected, activate the optical detector to enable a user to scan another string.

4. The scanner device of claim 2, wherein the script specifies a pattern for the string to be accepted as a valid barcode.

5. The scanner device of claim 4, wherein the pattern for the string determines whether the string includes proper content and format for the software application.

6. The scanner device of claim 5, wherein the script determines whether the string conforms to a ruleset that includes a regular expression pattern, a check digit, an embedded zip code, a group separator code, a recursion, an invisible character, or an application path to be accepted as the valid barcode.

7. The scanner device of claim 1, further comprising:

a speaker coupled to the processor, wherein the script is further configured to, when the string is accepted, instruct the speaker to emit a sound, and when the string is rejected, prevent the sound from being emitted from the speaker.

8. The scanner device of claim 1, wherein the script, to enrich the string before passing the string to the software application for processing, alters the string to a form consistent with a second symbology from a first symbology the string is originally received in to ensure compatibility with the software application.

9. The scanner device of claim 8, wherein the second symbology is compatible with a legacy system and wherein the first symbology is incompatible with the legacy system.

10. The scanner device of claim 9, wherein the script is further configured to enrich the string with a message generated based on data in a table corresponding to the string and to pass the enriched string to the software application.

11. The scanner device of claim 8, wherein the second symbology is compatible with the software application and wherein the first symbology is incompatible with the software application.

12. The scanner device of claim 1, further comprising a memory configured to store a table, and wherein the script is configured to look up the string in the table.

13. The scanner device of claim 12, wherein the script is configured to determine when the remote server is unavailable and to look up the string in the table when the remote server is unavailable.

14. The scanner device of claim 1, wherein the script is configured to determine when the remote server is available and to enrich the string when the remote server is available.

15. The scanner device of claim 1, wherein the string synchronizes periodically with the remote server.

16. The scanner device of claim 1, wherein the string represents a first drug and wherein the script is configured to generate a second string representing a second drug that is pharmacologically equivalent to the first drug and to pass the second string to the software application.

17. The scanner device of claim 1, wherein the string is a first string and wherein the script is configured to generate a second string based on the first string such that the second string is formatted in a manner compatible with the software application and the first string is formatted in a manner incompatible with the software application.

18. The scanner device of claim 1, further comprising:

a loop configured to be gripped by at least one finger of a hand of a user; and a body piece comprising an upper body portion affixed to the optical detector and the loop such that, when the at least one finger grips the loop and the hand is in a neutral position, the body piece is positioned to rest on a portion of an index finger of the hand of the user, the portion facing a thumb of the hand.

19. The scanner device of claim 18, wherein the body piece comprises an opening, and further comprises:

a display affixed to the body piece and configured to output visually from the scanner device, wherein the display comprises a touchscreen configured to, when selected, input information into the scanner device, wherein the display is angled away from the at least one finger to face the user to enable the thumb of the hand to select the touchscreen when the loop is gripped by the at least one finger.

* * * * *